(12) United States Patent
Jonsson

(10) Patent No.: US 9,914,216 B2
(45) Date of Patent: Mar. 13, 2018

(54) ROBOT CONTROL WITH IMPROVED SAFETY

(71) Applicant: ABB Schweiz AG, Baden (CH)

(72) Inventor: Ingvar Jonsson, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/441,349

(22) PCT Filed: Nov. 9, 2012

(86) PCT No.: PCT/EP2012/072263
§ 371 (c)(1),
(2) Date: May 7, 2015

(87) PCT Pub. No.: WO2014/071989
PCT Pub. Date: May 15, 2014

(65) Prior Publication Data
US 2015/0306766 A1    Oct. 29, 2015

(51) Int. Cl.
*B25J 9/18*        (2006.01)
*G05B 19/19*       (2006.01)
*B25J 9/16*        (2006.01)

(52) U.S. Cl.
CPC ........... *B25J 9/1656* (2013.01); *B25J 9/1674* (2013.01); *G05B 2219/36472* (2013.01)

(58) Field of Classification Search
CPC ...... G05B 19/4062; G05B 2219/42268; G05B 2219/45083; G05B 19/232; G05B 19/425; G05B 19/427; G05B 2219/37285; G05B 2219/37525; B25J 9/1674

USPC ............ 318/455, 436, 400.3, 568.11; 361/86
See application file for complete search history.

(56) References Cited

U.S. PATENT DOCUMENTS

| 4,475,160 A | * | 10/1984 | Inaba | G05B 19/4062 |
| | | | | 318/568.11 |
| 4,542,471 A | * | 9/1985 | Inaba | G05B 19/232 |
| | | | | 318/632 |
| 5,404,290 A | * | 4/1995 | Tsuchihashi | B25J 9/1674 |
| | | | | 700/264 |

(Continued)

FOREIGN PATENT DOCUMENTS

| EP | 0205975 A2 | 12/1986 |
| EP | 2388111 A2 | 11/2011 |

(Continued)

OTHER PUBLICATIONS

International Search Report and Written Opinion of the International Searching Authority Application No. PCT/EP2012/072263 Completed: Jun. 14, 2013; dated Jun. 21, 2013 pp. 10.

*Primary Examiner* — Paul Ip
(74) *Attorney, Agent, or Firm* — Whitmyer IP Group LLC

(57) ABSTRACT

For controlling a robot in a safe way, a highest voltage required for a desired robot movement is calculated. A voltage level in a DC-bus is set on the basis of the highest voltage, and current is supplied to a motor at a robot axis from the DC-bus. By limiting the voltage level in the DC-bus to correspond to an actual need for a desired robot movement at each instant unnecessary fast robot movements are prevented even in the event that an inverter controlling motor currents would by mistake attempt to drive the motor faster than desired by the operator.

18 Claims, 1 Drawing Sheet

(56) References Cited

U.S. PATENT DOCUMENTS

| | | | | |
|---|---|---|---|---|
| 6,735,537 B2* | 5/2004 | Liu | ............ | G01R 19/0092 318/599 |
| 6,759,824 B2* | 7/2004 | Kawabata | ........ | G11B 7/08529 318/436 |
| 6,909,573 B2* | 6/2005 | Kawabata | ........ | G11B 7/08529 360/75 |
| 7,005,607 B2* | 2/2006 | Takatani | ............ | B23K 9/022 219/124.34 |
| 8,624,538 B2* | 1/2014 | Yoshida | ............ | H02M 1/32 318/376 |
| 8,928,304 B2* | 1/2015 | Shimura | ........ | H01L 31/02021 323/299 |
| 2003/0011333 A1* | 1/2003 | Kawabata | ........ | G11B 7/08529 318/400.21 |
| 2003/0173946 A1* | 9/2003 | Liu | ............ | G01R 19/0092 324/107 |
| 2004/0074885 A1* | 4/2004 | Takatani | ............ | B23K 9/022 219/130.5 |
| 2004/0217725 A1* | 11/2004 | Kawabata | ........ | G11B 7/08529 318/436 |
| 2010/0133921 A1* | 6/2010 | Bird-Radolovic | .. | H04L 25/0266 307/326 |
| 2010/0145526 A1* | 6/2010 | Yamaguchi | ............ | B66C 13/40 700/275 |
| 2011/0260662 A1* | 10/2011 | Yoshida | ............ | H02M 1/32 318/400.3 |
| 2013/0278190 A1* | 10/2013 | Fink | ............ | B60L 11/1866 318/400.3 |
| 2013/0307489 A1* | 11/2013 | Kusch | ............ | B60L 11/1868 320/162 |
| 2015/0340854 A1* | 11/2015 | Richter | ............ | H02H 3/05 361/86 |

FOREIGN PATENT DOCUMENTS

| | | |
|---|---|---|
| JP | S58219614 A | 12/1983 |
| JP | S58222793 A | 12/1983 |
| JP | S59116802 A | 7/1984 |
| JP | S59208609 A | 11/1984 |
| JP | S61109485 A | 5/1986 |
| JP | S61147306 A | 7/1986 |
| JP | S62107308 A | 5/1987 |
| JP | S62163112 A | 7/1987 |

\* cited by examiner

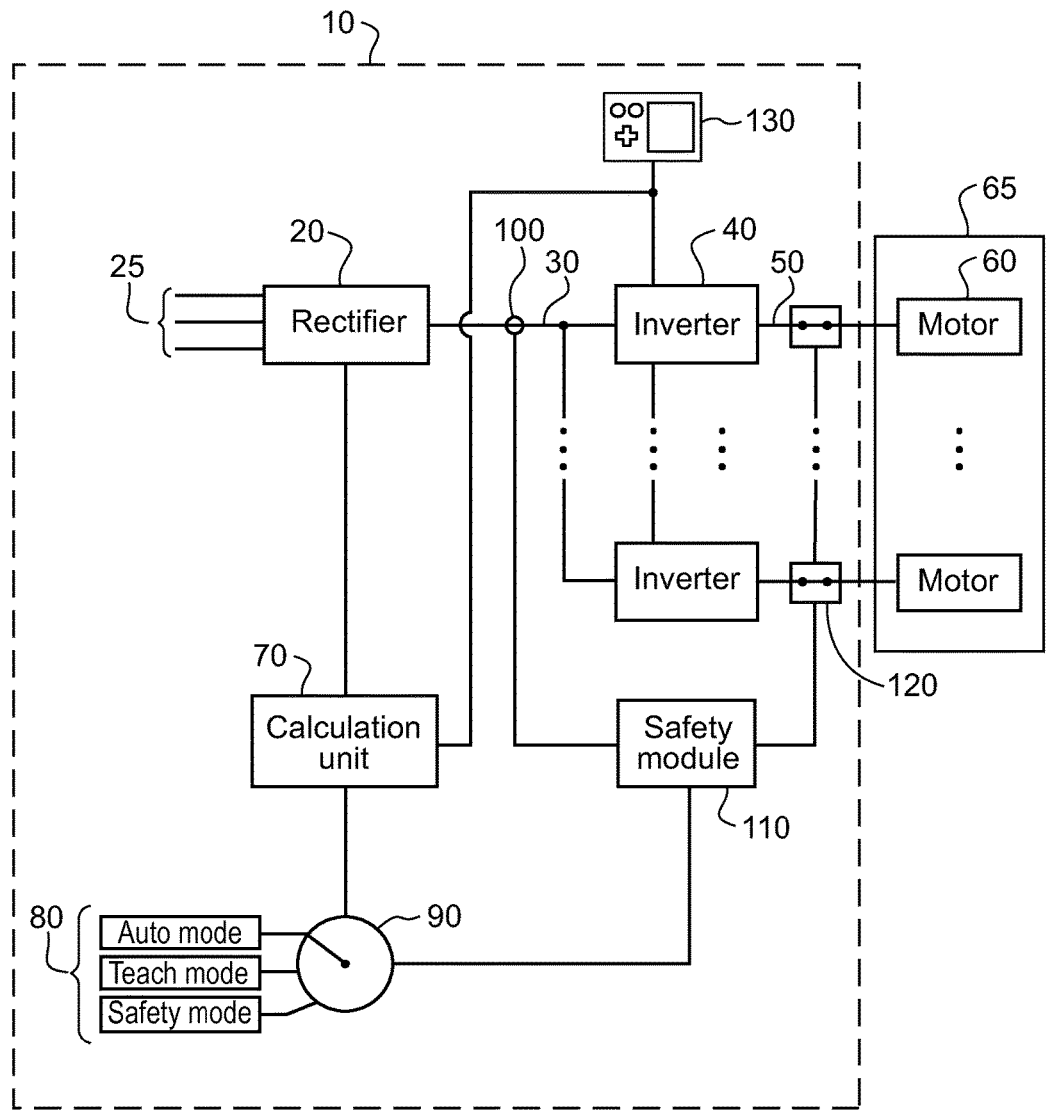

ROBOT CONTROL WITH IMPROVED SAFETY

FIELD OF THE INVENTION

The present invention relates to improved safety of an industrial robot by limiting a voltage level in a DC-bus supplying current to motors at robot axes.

BACKGROUND OF THE INVENTION

Many industrial robots have at least two different operation modes: an auto mode with normal operation speed, and a teach mode with a reduced speed. The different operation modes are typically achieved with a three phase transformer equipped with two voltage outputs having different voltage levels. A DC-bus supplying current to motors at robot axes has correspondingly a nominal voltage level for the auto mode, and a reduced voltage level for the teach mode. With the lower voltage level in the DC-bus, used in teaching the robot, the robot safety is increased by preventing the motors from moving at high speeds. The two voltage levels are predetermined by the physical construction of the transformer, and they cannot be easily changed.

The voltage level in the teach mode needs to be set to correspond to a "worst case" movement i.e. the maximum motor voltage that is required during a teach sequence. As a consequence, the teach mode voltage level is still much higher than required for the majority of teach sequence movements. In practice the auto mode voltage level can be 460 V and the teach mode voltage level 50 V. Although the maximum speed in the teach mode is significantly reduced, 50 V can still cause robot movements that people experience as fast, and that can cause serious injuries to an operator.

There remains a desire to further improve robot safety by preventing unnecessary fast robot movements.

SUMMARY OF THE INVENTION

One object of the invention is to provide a method for controlling a robot with an improved safety, and a corresponding robot drive unit.

This object is achieved by a method for controlling a robot.

The invention is based on the realization that by limiting a voltage level in a robot drive unit's DC-bus to correspond to an actual need for a desired robot movement at each instant unnecessary fast robot movements are prevented even in the event that an inverter controlling motor currents would by mistake attempt to drive the motor faster than desired by the operator.

According to a first aspect of the invention, there is provided a method for controlling a robot. The method comprises the steps of calculating a highest voltage required for a desired robot movement; setting a first voltage level in a DC-bus on the basis of the highest voltage; and supplying current to a motor at a robot axis from the DC-bus. Setting the voltage level in the DC-bus on the basis of the highest required voltage helps to avoid unnecessary fast robot movements.

According to one embodiment of the invention, the method further comprises the step of setting the first voltage level to be at most 50% higher than the calculated highest voltage, such as at most 30%, at most 20% or at most 10% higher than the calculated highest voltage. A margin on top of the calculated highest voltage ensures that the required voltage is always available even if the calculation would not be too precise.

According to one embodiment of the invention, the method further comprises the steps of providing more than one operation modes, each operation mode having a predetermined maximum voltage level in the DC-bus different from the maximum voltage levels of the remaining operation modes; and setting the first voltage level to be equal with the maximum voltage level of the current operation mode if the calculated highest voltage exceeds the maximum voltage level of the current operation mode. This measure ensures that a predetermined maximum voltage level for a certain operation mode is never exceeded.

According to one embodiment of the invention, the method further comprises the steps of measuring a voltage from the DC-bus; and actuating an emergency stop if the voltage exceeds the maximum voltage level of the current operation mode. This measure provides an additional safety function independent from the actively controlled voltage level in the DC-bus. Even if the calculation unit and/or the rectifier would fail to limit the voltage level in the DC-bus, the voltage measurement enables avoiding dangerously fast robot movements in operation modes having a reduced voltage level in the DC-bus.

According to one embodiment of the invention, the method further comprises the step of setting the first voltage level at least once per second, such as at least two times, at least five times, at least ten times, or at least twenty times a second. The more frequently the voltage level is set, the better it can be made to correspond to the voltage requires at each instant.

According to one embodiment of the invention, the number of operation modes is three.

According to one embodiment of the invention, one of the operation modes has a maximum voltage level that corresponds to a maximum voltage required for keeping an unloaded robot at standstill against gravity torque. The safety is further improved when the voltage level in the DC-bus does not even allow robot movements against gravity.

According to a second aspect of the invention, there is provided a robot drive unit comprising a DC-bus supplying current to a motor at a robot axis. The robot drive unit further comprises a calculation unit configured to calculate a highest voltage required for a desired robot movement, and a voltage source setting a first voltage level in the DC-bus on the basis of the highest voltage. Setting the voltage level in the DC-bus on the basis of the highest required voltage helps to avoid unnecessary fast robot movements.

According to one embodiment of the invention, the robot drive unit has three operation modes, each operation mode having a predetermined maximum voltage level different from those of the remaining operation modes, and the robot drive unit further comprises a mode selector for selecting an operation mode. Selection of an operation mode enables setting up an additional safety function independent from the actively controlled voltage level in the DC-bus.

According to one embodiment of the invention, the voltage source is configured to set the first voltage level to be equal with the maximum voltage level of the current operation mode if the calculated highest voltage exceeds the maximum voltage level of the current operation mode. This measure ensures that a predetermined maximum voltage level for a certain operation mode is never exceeded.

According to one embodiment of the invention, the robot drive unit further comprises a voltage sensor for measuring a voltage from the DC-bus, and a safety module which compares the measured voltage with the maximum voltage level of the current operation mode, the safety module being configured to actuate an emergency stop if the voltage exceeds the maximum voltage level of the current operation mode. This measure provides an additional safety function independent from the actively controlled voltage level in the DC-bus. Even if the calculation unit and/or the rectifier would fail to limit the voltage level in the DC-bus, the voltage measurement enables avoiding dangerously fast robot movements in operation modes having a reduced voltage level in the DC-bus.

BRIEF DESCRIPTION OF THE DRAWINGS

The invention will be explained in greater detail with reference to the accompanying drawing, wherein FIG. 1 schematically illustrates a robot drive unit and a robot according to one embodiment of the invention.

DETAILED DESCRIPTION OF THE INVENTION

Referring to FIG. 1, a robot drive unit 10 comprises a rectifier 20 converting a three phase alternating current (AC) in an AC power supply 25 into a direct current (DC) in a DC-bus 30. An inverter 40 converts the DC into an AC in a motor cable 50 for driving a motor 60 at a robot axis. A robot 65 may comprise six axes and correspondingly six motors 60 controlled by six inverters 40, all the motors 60 being supplied current from the same DC-bus 30.

An inverter 40 receives instructions to control the motor current and to thereby drive the respective motor 60 in a desired way. The instructions may originate from a robot program (auto mode) or from a teach pendant unit 130 (teach mode). The same instructions that are sent to the inverter 40, or, alternatively, the robot program or the control signals from which the instructions originate, are also sent to a calculation unit 70 comprising a dynamic simulation model of the robot 65. The simulation model takes into account factors like speed, acceleration, gravity, friction and field weakening. On the basis of the given information the calculation unit 70 continuously calculates a highest voltage required at the motors 60 to accomplish the desired robot movement. Preferably the calculation unit 70 makes the calculation independently from the instructions sent to the inverter 40. The calculation takes place several times per second, preferably every 12 milliseconds. The calculated highest voltage information is further sent to the rectifier 20 which sets a voltage level in the DC-bus 30 to be 20% over the calculated highest voltage, the 20% representing a margin assuring that the required voltage is always available.

According to one embodiment of the invention the robot drive unit 10 has three operation modes 80, an auto mode with normal operation speed, a teach mode with a reduced speed, and a safety mode with the ability to keep the robot 65 at standstill. Each operation mode 80 has a predetermined maximum voltage level different from those of the remaining operation modes 80. The auto mode has a maximum voltage level of 460 V, the teach mode has a maximum voltage level of 50 V, and the safety mode has a maximum voltage level of 17 V. The robot drive unit 10 comprises a mode selector 90 setting the predetermined maximum voltage level for each operation mode 80. An operator can enter a certain operation mode 80 by an active selection, and the robot drive unit 10 can change operation mode 80 automatically on the basis of sensor inputs. The current operation mode 80 is communicated to the calculation unit 70. In the event that the calculated highest voltage exceeds the maximum voltage level of the current operation mode 80, the calculation unit 70 sets the voltage level to be equal with the maximum voltage level of the current operation mode 80.

The voltage is measured from the DC-bus 30 by means of a voltage sensor 100. The measurement result is sent to a safety module 110 which also receives information of the current operation mode 80 from the mode selector 90. If the measured voltage exceeds the maximum voltage level of the current operation mode 80, an emergency stop immediately bringing the motors 60 to standstill is actuated. In practice actuating an emergency stop is equal with starting a predefined emergency stop sequence which may involve bringing a motor 60 to standstill in a controlled way, activating a mechanical brake, and interrupting the current supply to the motor 60 by actuating a switch 120.

When the teach mode is selected the mode selector 90 sets the maximum voltage level to 50 V. The calculation unit 70 calculates continuously on the basis of a signal from the teach pendant unit the maximum voltage required for the desired robot movement. At certain instant the required voltage may be only 10 V, and the calculation unit 70 sets the voltage level in the DC-bus 30 to 12 V to have 20% margin to the calculated value. Now, even if the instructions to an inverter 40 would erroneously attempt to move the robot 65 at double speed compared with the speed desired by the operator, or the inverter 40 itself would experience a malfunction with the same result, such an unnecessary high speed could not be accomplished because of the reduced voltage level in the DC-bus 30.

When the safety mode is selected the mode selector 90 sets the maximum voltage level to 17 V. According to the present example this voltage level is just enough to keep an unloaded robot 65 at standstill in any position against gravity torque.

The invention is not limited to the embodiments shown above, but the person skilled in the art may modify them in a plurality of ways within the scope of the invention as defined by the claims.

The invention claimed is:

1. A method for controlling a robot with a robot drive unit, the method comprising the steps of:
    setting with a mode selector unit a predetermined maximum voltage level;
    calculating with the robot drive unit a highest voltage required for a robot movement;
    setting with the robot drive unit a limit of a first voltage level in a DC-bus on the bases of the maximum voltage level and the highest voltage; and
    supplying current to a motor at a robot axis from the DC-bus so that the motor can perform the robot movement.

2. The method according to claim 1, the method further comprising the step of:
    setting the first voltage level to be at most 50% higher than the calculated highest voltage.

3. The method according to claim 1, the method further comprising the steps of:
    providing more than one operation modes, each operation mode having a predetermined maximum voltage level in the DC-bus different from the maximum voltage levels of the remaining operation modes; and
    setting the first voltage level to be equal with the maximum voltage level of the current operation mode if the calculated highest voltage exceeds the maximum voltage level of the current operation mode.

4. The method according to claim 3, the method further comprising the steps of:
measuring a voltage from the DC-bus; and
actuating an emergency stop if the voltage exceeds the maximum voltage level of the current operation mode.

5. The method according to claim 3, wherein the number of operation modes is three.

6. The method according to claim 3, wherein one of the operation modes has a maximum voltage level that corresponds to a maximum voltage required for keeping an unloaded robot at standstill against gravity torque.

7. The method according to claim 1, the method further comprising the step of:
setting the first voltage level at least once per second.

8. The method according to claim 1, wherein the step of calculating is performed with a calculation unit and the step of setting is performed with a rectifier.

9. The method according to claim 1, wherein a plurality of motors are supplied current by the DC-bus.

10. The method according to claim 1, wherein a rectifier sets the limit in the DC-bus.

11. The method according to claim 1, wherein the step of calculating is based at least in part on instructions used by an inverter to control the robot movement.

12. A robot drive unit comprising
a mode selector unit configured to set a predetermined maximum voltage level,
a DC-bus supplying current to a motor at a robot axis,
characterized in that the robot drive unit further comprises a calculation unit configured to calculate a highest voltage required for a robot movement, and a voltage source setting a limit of a first voltage level in the DC-bus on the bases of the maximum voltage level and the highest voltage, the current from the DC-bus supplied to the motor to perform the robot movement.

13. The robot drive unit according to claim 12, wherein the robot drive unit has three operation modes, each operation mode having a predetermined maximum voltage level different from those of the remaining operation modes, and the robot drive unit further comprises the mode selector for selecting an operation mode.

14. The robot drive unit according to claim 13, wherein the voltage source is configured to set the first voltage level to be equal with the maximum voltage level of the current operation mode if the calculated highest voltage exceeds the maximum voltage level of the current operation mode.

15. The robot drive unit according to claim 12, wherein the robot drive unit further comprises a voltage sensor for measuring a voltage from the DC-bus, and a safety module which compares the measured voltage with the maximum voltage level of a current operation mode, the safety module being configured to actuate an emergency stop if the voltage exceeds the maximum voltage level of the current operation mode.

16. The robot drive unit according to claim 12, wherein a plurality of motors are supplied current by the DC-bus.

17. The robot drive unit according to claim 12, wherein the first voltage level is set at least once per second.

18. A robot drive unit comprising:
a DC-bus supplying current to a motor at a robot axis;
a voltage sensor measuring a voltage from the DC-bus;
the robot drive unit having three operation modes, each operation mode having a predetermined maximum voltage level different from those of the remaining operation modes;
a safety module comparing the measured voltage with the maximum voltage level of a current operation mode, and actuating an emergency stop if the voltage exceeds the maximum voltage level of the current operation mode;
a calculation unit calculating a highest voltage required for a robot movement, and setting a limit of a first voltage level in the DC-bus on the basis of the highest voltage, the current from the DC-bus supplied to the motor to perform the robot movement.

* * * * *